Oct. 27, 1964   D. E. WILLIAMS   3,154,030
METHOD OF PLANTING SEED
Filed Feb. 26, 1962   3 Sheets-Sheet 1

INVENTOR.
Donald E. Williams.
BY
Hovey, Schmidt, Johnson & Hovey
ATTORNEYS

Oct. 27, 1964  D. E. WILLIAMS  3,154,030
METHOD OF PLANTING SEED
Filed Feb. 26, 1962  3 Sheets-Sheet 2

INVENTOR.
Donald E. Williams
BY
Hovey, Schmidt, Johnson & Hovey
ATTORNEYS.

Oct. 27, 1964    D. E. WILLIAMS    3,154,030
METHOD OF PLANTING SEED
Filed Feb. 26, 1962    3 Sheets-Sheet 3

INVENTOR.
Donald E. Williams
BY
Hovey, Schmidt, Johnson & Hovey
ATTORNEYS.

3,154,030
METHOD OF PLANTING SEED

Donald E. Williams, Garden City, Kans., assignor to Acra-Plant, Inc., Newton, Kans., a corporation of Kansas
Filed Feb. 26, 1962, Ser. No. 175,728
9 Claims. (Cl. 111—1)

This invention relates to crop planting equipment, and more particularly, to apparatus for accurately planting various types of seeds in spaced, longitudinally extending rows.

In conventional seed planting apparatus, it is the usual practice to provide means for forming a furrow in the soil whereupon the seeds are dropped in the furrow and press wheel structure is then passed over the furrow to cover the seeds with soil initially pushed aside during the formation of the furrow itself. In planting the seeds in this manner, no provision is made for apparatus adapted to locate the seeds in accurate, spaced relationship or capable of orientating the seeds in any particular position in the ground. It is evident, therefore, that the seeds gravitate into the furrow and assume random relative positions longitudinally of the rows. Also, in planting of flat sided seeds such as seed corn, the seeds are deposited in the furrows so that some of the seeds lie on their sides, others lie on their edges, while still others lie in inclined positions with respect to the surface of the ground.

With reference to seed corn, it has been found that if the seeds are planted so that the same are oriented so that the flat sides thereof are in upright positions, the yield from a given crop is sufficiently increased to warrant planting of all of the seeds on edge and thereby preventing planting of any of the seeds on their sides. The increase in yield of the crop is believed to be attributable to the fact that the leaves of the plants produced from the seeds are disposed transversely of the longitudinal direction of the rows so that adjacent plants may receive a maximum amount of sunlight without being shaded by other plants and, further, because of the fact that the space between the rows is sufficiently shaded by the leaves to retard evaporation of moisture from the soil and thereby causing the soil to retain greater amounts of moisture for supplying the roots of the plants.

The present invention provides structure for planting the seeds of the aforesaid nature in accurate spaced relationship and with flat-sided seeds being on edge so that the results mentioned above may be obtained with less working of the soil being required and assuring greater crop yield. In this way, plant casualties normally encountered with the use of conventional equipment are significantly reduced except to the extent occurring because of nonfertility of the seeds.

It is the primary object of the invention to provide novel structure for accurately planting seeds in a groove formed in the ground so that more uniform competition is assured between the seeds for moisture and nutrients in the soil.

It is a further important object of the invention to provide seed-planting apparatus having novel structure for forming a generally V-shaped groove in the ground of configuration such that the apex thereof is narrower than the effective width of each of the seeds so that when the latter are deposited in the groove, the seeds are wedged between the side walls thereof and thus are accurately positioned longitudinally of the rows presented by the grooves.

It is another object of the present invention to provide structure for planting seeds of the nature of seed corn or the like wherein the seeds are placed on edge rather than on the sides thereof so that the crop yield from the sprouts issuing from the seeds will be significantly increased by virtue of the optimum utilization of the moisture within the soil and by virtue of the plants being oriented to receive increased exposure to sunlight due to the orientation of the leaves of the plants transversely of the rows thereof during growth of the same.

Another important object of this invention is the provision of structure for forming a groove in the soil having a width substantially equal to the thickness of the seeds to be planted whereby flat-sided seeds will be disposed on edge when the same are placed within the groove, thus preventing random placement of the seeds with some disposed on the sides thereof.

Still another important object of this invention is the provision of apparatus for forming a groove of the aforesaid character in the soil to a predetermined depth below the surface of the soil whereby all of the seeds are located substantially equal distances below the surface of the soil so that the sprouts issuing from the seeds will grow uniformly and thus assure that the same will receive the increased sunlight exposure requisite for the aforesaid increased crop yield.

Yet another object of this invention is the provision of structure for forming a groove in the soil defined by a pair of generally parallel, relatively firm walls spaced a distance apart substantially equal to the thickness of the seeds wherein the major faces of the seeds are in relatively close proximity to the walls defining the groove to thereby maintain the moisture level around the seeds substantially constant and thus assure a mininmum of moisture evaporation from the vicinity of the individual seeds.

Another object of this invention is the provision of structure carried by the groove-forming means for enlarging the groove at the uppermost portion thereof, whereby the placement of the seeds within the groove is facilitated to thereby assure that the seeds are disposed on edge when the same gravitate into the groove.

Another object of the present invention is to provision of groove-forming means in the nature of an elongated runner having blade means on the lowermost edge thereof for forming the groove in the soil, which runner is provided with attachment means thereon similar to attachment means on furrow-forming devices of conventional planting apparatus whereby the runner may be utilized with the aforesaid conventional apparatus with little or no modification thereto.

Another object of this invention is the provision of groove-forming means in the nature of a rotatable disc having a peripheral edge adapted for engaging the soil whereby the groove is formed in the soil as the disc rotates and the entire peripheral edge is, therefore, utilized to form said groove.

Another object of the present invention is the provision of groove-widening means and means complemental with the widened portion of the groove for maintaining the latter open until the seeds are placed within the groove whereby soil is prevented from gravitating back into the groove at least until the seeds have already been properly positioned therewithin.

Other objects of this invention will become apparent as the following specification progresses, reference being had to the accompanying drawings, wherein.

Figure 1:
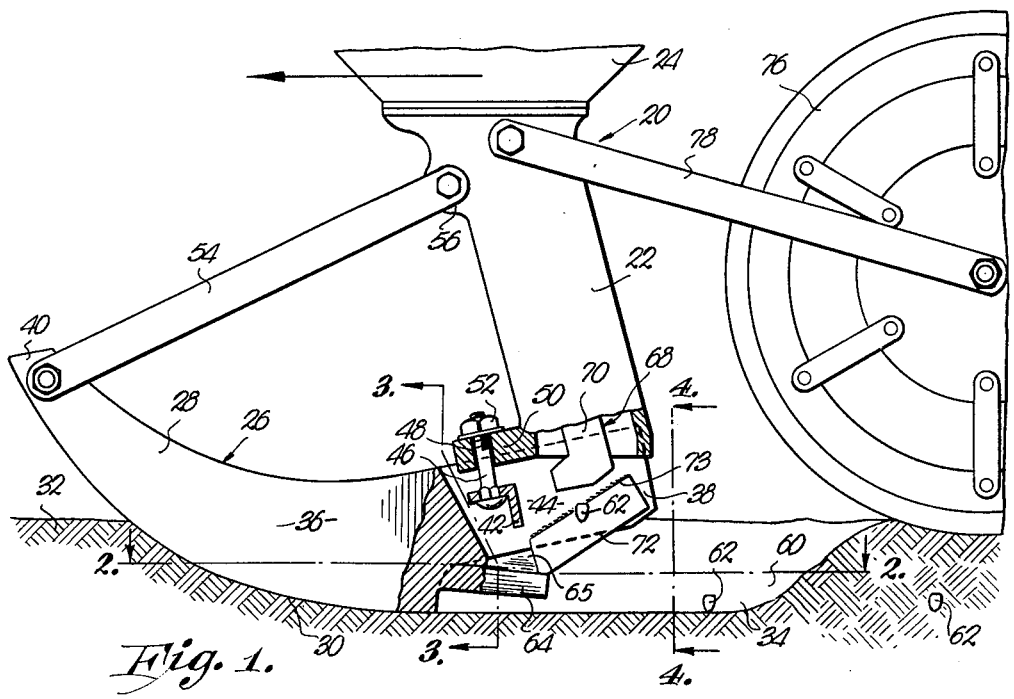
FIGURE 1 is a fragmentary, side elevational view of one embodiment of the instant invention and illustrating the groove-forming means thereon, the seed-placing means and the means for covering the groove after the seeds have been placed therewithin, parts being in section to illustrate details of construction.
Figure 2:
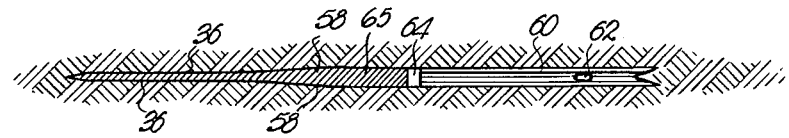
FIG. 2 is a plan view of a portion of the structure illustrated in FIG. 1 taken along line 2—2 of FIG. 1.
Figure 12:
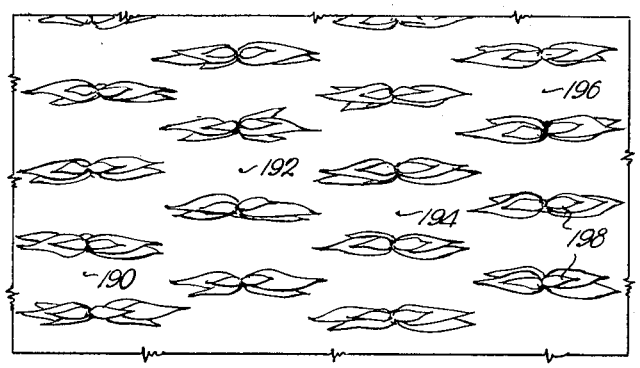
Figure 13:
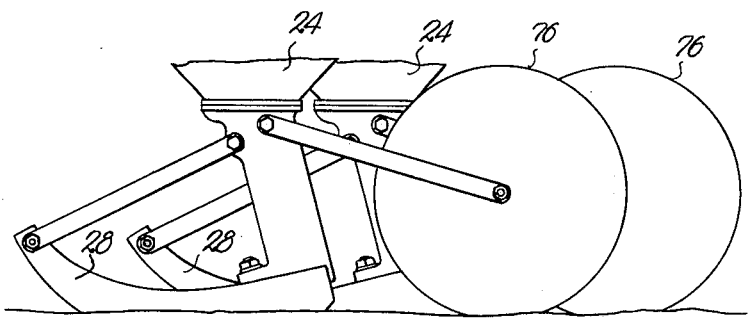

FIG. 12 is a plan view of a portion of the ground in and around a crop and illustrating the sprouts of the crop in one row as being staggered with respect to the sprouts in the rows adjacent thereto; and FIG. 13 is a side elevational view of a pair of devices similar to the device illustrated in FIG. 1 and showing the relative fore and aft positions of the devices to stagger the plants in the manner illustrated in FIG. 12.

The present invention provides groove-forming means for forming an elongated groove in the soil, which groove is substantially transversely rectangular for receiving seeds having a pair of opposed major faces so that the faces are in close proximity to the ground on each side of the groove, thus assuring that the seeds are on edge when the same are disposed within the groove.

One embodiment of the groove-forming means takes the form of an elongated runner having a lowermost sharpened edge adapted for cutting or slicing the ground, to thereby form the aforesaid groove. A boss is secured to each side of the runner above the lowermost edge thereof for widening the groove to thereby facilitate the placement of the seeds within the latter. Means is further provided for preventing the gravitation of soil back into the groove at least until the seeds have been placed therewithin.

A second embodiment of the groove-forming means includes a rotatable disc having a peripheral edge engageable with the ground for cutting or slicing the groove therewithin. A pair of members are carried by the disc on opposed sides thereof and are provided with substantially convex, outermost surfaces engageable with the ground at the uppermost portion of the groove for widening the latter and therefore, facilitating the placement of seeds therewithin.

Seed-placing means is provided rearwardly of the groove-forming means to place seeds within the groove after the same has been formed. Means is provided rearwardly of the seed-placing means for closing the groove after the seeds have been placed therewithin.

One of the embodiments of the instant invention is illustrated in FIGS. 1 to 4 inclusive and includes planting apparatus 20 comprised of an enlongated support 22 adapted to be carried in any suitable manner behind a towing vehicle such as a tractor or the like. Support 22 is substantially tubular and is in communication with a hopper 24 thereabove which is disposed for containing a supply of seeds to be planted by apparatus 20.

Groove-forming means 26 is carried at the normally lowermost end of support 22 and includes an elongated runner 28 having a generally lowermost edge 30 engageable with the ground 32 for forming a longitudinally extending groove 34 within the latter. Runner 28 is provided with a pair of opposed, substantially parallel sides 36, it being clear that edge 30 is arcuate and extends from a point below the bifurcated rearmost end 38 of runner 28 to the forwardmost end 40.

Figure 4:
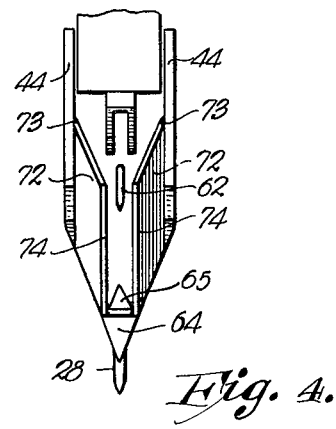
FIG. 4 is an enlarged, fragmentary view taken along line 4—4 of FIG. 1.

An L-shaped bracket 42 carried between the sides 44 forming the bifurcated end 38 receives, through an opening therein, an elongated bolt 46 which also passes through an opening 48 in a projection 50 on the lowermost end of support 22. A nut 52 is threaded on bolt 46 and therefore, secures the rearmost end 38 of runner 28 to support 22. A radius bar 54 interconnects the forward end 40 of runner 28 with a projection 56 adjacent the upper end of support 22. As illustrated in FIG. 4, sides 44 of end 38 embrace the lower end of support 22 to prevent lateral movement of runner 28 during forward movement thereof. A boss 58 is integral with each side 36 of runner 28 above edge 30 thereof. Bosses 58 are utilized for widening the uppermost portion 60 of groove 34 to thereby facilitate the placement of seeds 62 therewithin.

Figure 3:
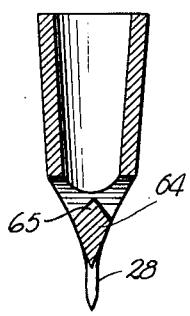
FIG. 3 is an enlarged, fragmentary, cross-sectional view taken along line 3—3 of FIG. 1.
Figure 9:
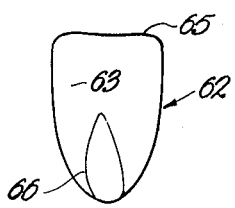
FIG. 9 is a side elevational view of a seed on an enlarged scale, such as a seed of corn to be planted by the device forming the subject of the present invention.
Figure 10:
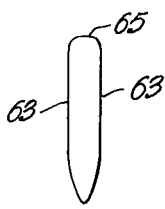
FIG. 10 is an end elevational view of the seed illustrated in FIG. 9.

As shown in FIGS. 3 and 4, bosses 58 are provided with outermost surfaces which are substantially convergent as edge 30 is approached. Furthermore, bosses 58 are divergent in a horizontal plane as end 38 is approached and as is clear in FIG. 2. The configuration of uppermost portion 60 is therefore, of a V-shape and assures that seeds 62 will be disposed on edge when the same are positioned within groove 34, it being clear that groove 34 is provided with a transverse dimension substantially equal to the thicknesses of seeds 62. Each seed 62 is of the form illustrated in FIGS. 9 and 10 and includes a pair of opposed major faces 63 separated by a peripheral edge 65 of a certain thickness. A germ 66 is disposed on one of the faces 63.

Runner 28, at least in the vicinity of edge 30 thereof, is formed from a highly wear-resistant, hardened material such as steel or the like, which material permits edge 30 to be sharpened and to retain its cutting capabilities over long periods of time. It is to be noted that the thickness of runner 28 in the vicinity of lowermost edge 30 thereof is substantially equal to the thicknesses of the seeds 62 and thereby the transverse dimension of groove 34.

Elongated structure 64 is carried by runner 28 adjacent the rearmost portion of edge 30 thereof. Structure 64 is transversely triangular as illustrated in FIGS. 3 and 4 and is substantially complemental to the widened portion 60 of groove 34. Structure 64 is horizontally aligned with bosses 58 and is utilized for maintaining the shape of portion 60 at least until seeds 62 have been deposited within groove 34. As is illustrated in FIG. 1, the longitudinal axis of structure 64 is inclined and is directed downwardly and rearwardly. A generally triangular, preferably hollow member 65 is rigid to the upper surface of structure 64 and is spaced below bracket 42. Member 65 is utilized to prevent soil from falling into the groove formed by runner 28 in the event that the latter penetrates the ground too deeply.

Seed placement means 68 includes an elongated, tubular device 70 carried within support 22 and communicating with hopper 24 for delivering seeds 62 from the latter to a location between sides 44 of end 38. A pair of spaced, downwardly and inwardly directed plates 72 are secured to the inner surfaces of sides 44 in any suitable manner such as by welding or the like. As shown in FIGS. 1 and 4, the generally uppermost, longitudinal edges 73 of plates 72 are welded to the inner surfaces of sides 44, and the lowermost edges 74 are spaced-apart a predetermined distance to permit the passage of seeds 62 therebetween. The lowermost portions of plates 72 are secured to the rearmost portion of structure 64 as illustrated in FIG. 1.

A conventional press wheel 76 is carried on support 22 rearwardly thereof by means of a radius bar 78. Wheel 76 is provided with a transversely concave, peripheral edge adapted for engaging the ground on opposed sides of groove 34 and upper portion 60 for filling in groove 34 and portions 60 after seeds 62 have been placed within groove 34.

A second embodiment of the instant invention is illustrated in FIGS. 5 to 8 inclusive and includes planting apparatus 120 comprising an elongated, tubular support 122 in depending relationship to a seed-containing hopper 124. Groove-forming means 126 includes a disk 128 having a peripheral edge 130 adapted for engaging the soil 132 for forming an elongated groove 134 therein.

It is noted that disk 128 is provided with a pair of opposed, generally parallel sides 136 separated by a distance substantially equal to the thicknesses of seeds 162 carried by hopper 124 and adapted to be disposed within groove 134. Disk 128 is rotatable about the axis of a horizontally disposed shaft 138 carried forwardly of support 122 by radius bars 154 secured to projections 150 and 156 on the forwardmost portion of support 122. A circular member 158 is carried on shaft 138 adjacent each side 136 of disk 128.

Each member 158 is provided with a generally convex, outermost surface and has a diameter less than the diameter of disk 128. Members 158 are utilized for widening the uppermost portion of groove 134 to facilitate the placement of seeds 162 within the latter. A roller 164 is carried by a pair of depending arms 165 for movement about a horizontal axis defined by a shaft 166 passing through aligned openings adjacent the lowermost ends of arms 165. Roller 164 is preferably formed from a highly wear-resistant material such as hard rubber or the like, and is utilized for preventing soil from entering the enlarged portion 160 of groove 134 until seeds 162 have gravitated into groove 134. The opposed, angularly disposed surfaces of roller 164 are spaced apart a distance slightly greater than the effective transverse dimension of members 158, and thereby compact and firm the walls of the groove to assure that the latter retains the configuration of the same produced by groove-forming means 126.

Figure 6:
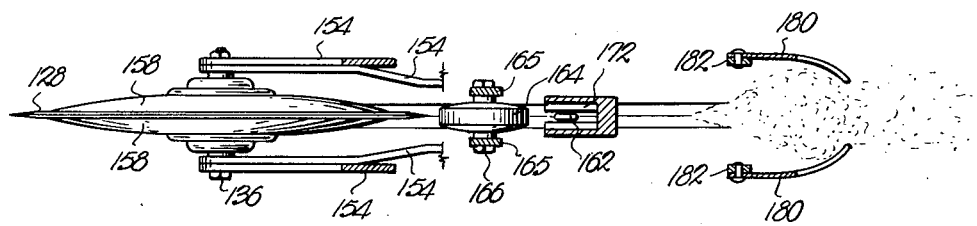
FIG. 6 is a fragmentary, cross-sectional view taken along line 6—6 of FIG. 5.
Figure 7:
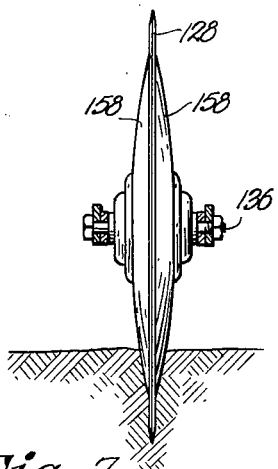
FIG. 7 is a cross-sectional view taken along line 7—7 of FIG. 5.
Figure 8:
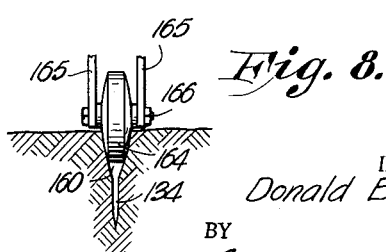
FIG. 8 is a fragmentary, cross-sectional view taken along line 8—8 of FIG. 5.

Support 122 is tubular in transverse cross section and carries a tubular device 170 therewithin which is in communication with hopper 124 for delivering seeds 162 to a location directly to the rear of roller 164. A pair of deflecting plates 172 is directed downwardly and forwardly from support 22 for directing seeds 162 into groove 134 as disk 128 moves forwardly under the action of a towing vehicle operably coupled therewith. Plates 172 are provided with inclined sides 173 which cause the seeds to move through the space between plates 172 as shown in FIG. 6. By virtue of the presence of widened portion 160 and the transverse dimension of groove 134, seeds 162 are positioned on edge when the same are placed within groove 134.

Figure 5:
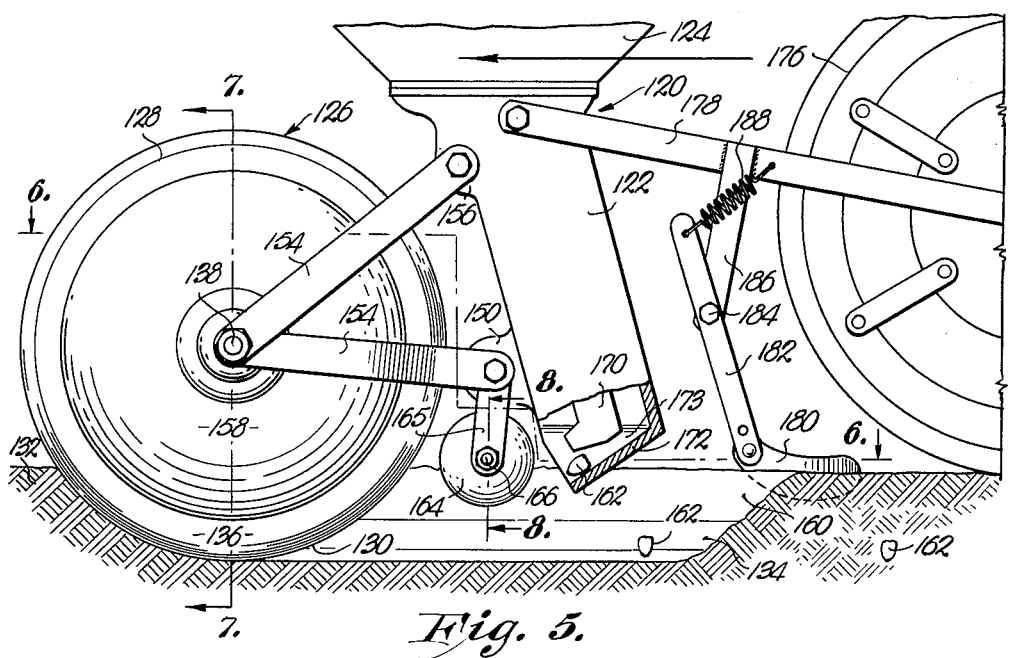
FIG. 5 is a side elevational view of a second embodiment of the instant invention and illustrating the groove-forming means therefor disposed forwardly of seed-placing means and groove-covering means, parts being in section to illustrate details of construction.
Figure 11:
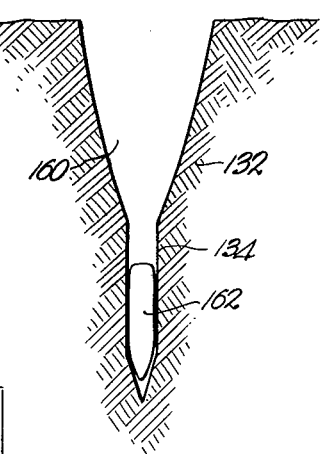
FIG. 11 is a transverse view of the groove formed by the groove-forming means illustrated in FIG. 5 and showing the position of a seed therein similar to the seed illustrated in FIG. 9.

A conventional press wheel 176 is carried by a pair of radius bars 178 on and rearwardly of support 122 as is clear in FIG. 5. The peripheral edge of press wheel 176 is transversely concave to press soil inwardly to cover groove 134 after seeds 162 have been placed therewithin. A pair of blades 180 are carried by legs 182 pivotally mounted at 184 on extensions 186 rigidly secured to bars 178. A coil spring 188 biases each leg 182 so that blades 180 are biased downwardly and into engagement with ground 132. Blades 180 facilitate the covering of groove 134 with soil after seeds 162 have been placed within groove 134. As shown in FIG. 6, blades 180 are arcuate and extend rearwardly and inwardly to assure complete covering of the groove 134. FIGURE 11 illustrates groove 134 and widened portion 160 thereabove. In addition, a seed 162 is disposed within groove 134 below the junction of the latter with portion 160. It is clear that the configuration of groove 134 is substantially transversely rectangular, whereas the configuration of groove 160 is substantially triangular by virtue of the convex, outer surfaces of members 158.

FIGURE 12 illustrates a number of crop rows 190, 192, 194 and 196 having individual plants 198. It is noted that the plants 198 in adjacent rows are in staggered relationship, and to accomplish this, at least a pair of runners 28 or a pair of disks 128 are operably coupled so that one of the runners 28 or one of the disks 128 is maintained forwardly of the outer runner 28 or the other disk 128 respectively. To illustrate this, a pair of runners 28 are shown in FIG. 13 with one of the runners 28 being disposed forwardly of the other runner 28. This permits seeds 62 carried within hoppers 24 to be simultaneously deposited within the corresponding grooves 34 formed by runners 28. In this way, the seeds in adjacent rows are in offset relationship longitudinally thereof. Although the planters illustrated in FIG. 3 are shown in offset relationship, it is to be recognized that the hoppers 24 may be aligned transversely of the row if desired with the seed-release mechanisms therein being timed so that the seeds in adjacent rows are deposited in the grooves thereof in offset relationship in the same way accomplished by offsetting the planting mechanisms.

The ground on opposed sides of grooves 34 and 134 is substantially firm since the action of runner 28 and disk 128 is a slicing or cutting action and one which does not break up the soil in the vicinity of the respective grooves. This maintains the moisture level constant around the seeds within the respective grooves and, therefore, there is little or no chance for evaporation of the moisture since the soil is firm, nonaerated, and non-aggregated. In addition, the seeds are all at uniform depths below the surface of the soil since runner 28 and disk 128 are disposed for penetrating the ground to a predetermined depth. The grooves formed by runner 28 and disk 128 remain open until the seed is dropped by virtue of the presence of structure 64 and roller 164 respectively. This eliminates the possibility of debris, clods or soil from entering the respective grooves before the seeds are placed therewithin.

The press wheels corresponding to runner 28 and disk 128 re-firms soil on top of the planted seeds without substantial compaction of the soil to leave an insulating layer above the seeds while reducing the moisture migration from the vicinity of the seeds through evaporation. This, therefore, further assures the constant moisture level in and around the seed which is requisite for the increased crop yield described above. In addition, the seeds will come up through the region where the corresponding groove was once formed with a minimum of diversion and with a maximum of ease. The pressing down of the soil by the press wheel prevents wind and water erosion without interfering with the proper passage of moisture downwardly to the seed. Furthermore, the soil pressed down by the press wheel does not form an obstacle to the upward path of the sprouts from the seeds, since the sprouts normally follow the path of least resistance. Since the seeds are directly below the surface, the sprouts have an opportunity to go directly upward and emerge from the soil pressed downward by the press wheel. This permits the sprouts to rise to the surface as soon as possible so that the same may be exposed to the sunlight at the earliest possible moment.

The use of disk 128 is especially advantageous since the operation thereof minimizes the upward movement of soil and thereby prevents the crumbling of the ground during the formation of the respective groove. In addition, both runner 28 and disk 128 essentially compact the ground which forms the sides of the grooves 34 and 134.

The operation of apparatus 20 is as follows: Support 22 is secured in any suitable manner to a towing device such as a tractor or the like. Seeds 62 are disposed within hopper 24 and means is provided between hopper 24 and support 22 for delivering individual seeds 62 to tubular device 70 at predetermined intervals. Support 22 is secured to the towing device so that runner 28 is positioned as illustrated in FIG. 1 with the lowermost edge 30 thereof in groove-forming relationship to ground 32 below support 22.

As the towing device is actuated, runner 28 is pulled in the direction of the arrow shown in FIG. 1 and edge 30 passes through ground 32 to cut or slice the same to thereby form groove 34 therewith. Concurrently therewith, seeds 62 are delivered through device 70 to groove 34 at the aforesaid predetermined intervals so that seeds 62 are substantially equally spaced-apart and are all located substantially at the same depth below the surface of the ground. Press wheel 76 trails support 22 and covers groove 34 and uppermost portion 60 of the latter to thereby cover the seeds 62 in the manner shown in FIG. 1. It is clear that edge 30 of runner 28 must be maintained in a sharpened condition and it is for this reason that the material in the vicinity of edge 30 be one capable of maintaining a sharpened edge over long periods of time.

Apparatus 120 is operated in substantially the same manner as apparatus 20 except that support 122, moved in the direction of the arrow of FIG. 5, causes disk 128 to rotate about the axis of shaft 138 under the influence of the forward movement of the towing device. Peripheral edge 130 of disk 128 therefore, cuts or slices ground 132 as disk 128 rotates, and it is clear therefore, that the entire peripheral edge 130 is utilized as a cutting surface to thereby prolong the life of edge 130. Similarly, seeds 162 are caused to pass downwardly through tubular device 170 at predetermined intervals so that seeds 162 are spaced substantially equal distances apart by virtue of the fact that the seeds stop where they are dropped in groove 134. Press wheel 176 in conjunction with blades 180 covers seeds 162 without substantial compaction of the soil thereabove.

The advantages of the use of apparatus 20 or apparatus 120 are that substantial re-planting of seeds is essentially eliminated, more even stands result, the sprouts emerge uniformly through the soil and at the same time the seeds stop and remain in place where they are dropped in the groove, uniform and constant moisture levels are maintained in the vicinities of the seeds themselves which bring about an early maturity to the sprouts which ultimately results in an increased crop yield.

Planting of seeds in the manner described gives substantially equal sunlight to the sprouts after the same have emerged through the soil, since the leaves of the sprouts are arranged transversely of the rows and substantial evaporation of the moisture in the soil between the rows is minimized since the leaves overlie the space between the rows and thereby shade such space. This method of planting further minimizes casualties of the plants attributable to the way in which the seeds are planted.

It is to be noted that the use of roller 164 is advantageous because of the low coefficient of friction thereof with the ground and reduction of the power required to move the same through a respective groove, while at the same time the portion 160 remains open until seeds 162 have been deposited within groove 134.

Apparatus 20 and apparatus 120 can both be operated in soil which has been worked in the normal manner required for planting seed crops, although such working of the soil should be kept to a minimum to prevent breaking up of the ground into very fine particle sizes. Since runner 28 and disk 128 function to compact the walls of soil forming the respective grooves, it is clear that the grooves remain open at least until the seeds have been placed therewithin. The runner 28 and disk 128 also act to cut or slice the soil, permitting formation of a groove of proper configuration in soil of varying conditions and grooves may be formed accurately to a predetermined depth even in heavy trash.

It is also apparent that the seeds stop within the grooves at substantially the exact point where they are dropped, thereby assuring that the plants will be spaced equal distances apart since the seed placement means, which include tubular devices 70 and 170 in apparatuses 20 and 120, deliver the seeds at substantially equal intervals.

The significance of the forming of V-shaped grooves of the configuration as shown in FIG. 11 is readily apparent, when it is appreciated that seeds deposited in groove 160, regardless of the configuration thereof, gravitate downwardly into the lower portion 134 of the groove and are thereby retained in proper disposition longitudinally of the groove and do not tend to bounce or roll along the groove as has been the case in furrows made by other planting equipment. It is to be pointed out that the shape of the groove 160 may be altered by changing the configuration of devices 70 and 170 to accommodate seeds of different diameters or widths. In all cases, however, the devices 70 and 170 should be constructed so that the apex of the groove formed thereby is somewhat less than the effective width of the seed deposited therein, so that such seed becomes wedged between the side walls of the groove and does not bounce or otherwise roll along the groove. This results in very accurate positioning of the seeds longitudinally of the groove into which the same are dropped, and assures even competition between the seeds for moisture and nutrients in the soil. Another significant advantage of the present mechanism is the fact that the seeds are dropped into the groove within a generally vertical plane passing through the apex of the groove and, therefore, the seeds are all in alignment longitudinally of the V-shaped groove. Also, it is to be emphasized that placement of the seeds in the V-shaped grooves of the configuration specified and pressing of the seeds downwardly into the apex of the groove by the press wheel structure of the planter, prevents shifting or displacement of the seeds in the groove during covering thereof with soil as has occurred in prior planting equipment.

Another significant advantage of the present apparatus is the fact that the moisture level surrounding the individual seeds is maintained more constant by virtue of the configuration of the grooves receiving the seeds, thereby causing greater uniformity of the moisture content of the ears of corn throughout the entire field. Furthermore, such placement of the seeds within the grooves has been found to equalize plant competition between adjacent sprouts.

Having thus described the invention, what is claimed as new and desired to be secured by Letters Patent is:

1. A method of planting seeds, each having a pair of opposed major faces circumscribed by a peripheral edge, said method comprising the steps of:
   (a) forming a groove in the ground having a transverse dimension substantially equal to the distance between the major faces of said seeds;
   (b) widening the sides of said groove adjacent the uppermost portion thereof to facilitate the placement of said seeds within the groove;
   (c) depositing said seeds on edge within the groove whereby said faces of the seeds are in relatively close proximity to the ground defining said groove; and
   (d) covering the seeds with soil.

2. A method of planting seeds, each having a pair of opposed major faces circumscribed by a peripheral edge, said method comprising the steps of:
   (a) forming a groove in the ground having a transverse dimension substantially equal to the distance between the major faces of said seeds;
   (b) widening said groove adjacent the uppermost portion thereof to facilitate the placing of said seeds within the groove;
   (c) maintaining the groove free of clods and loose soil at least until said seeds have been deposited in said groove;

(d) depositing said seeds within the groove, whereby the seeds are disposed on edge and said faces thereof are in relatively close proximity to the ground defining said groove; and (e) covering the seeds with soil.

3. A method of planting seeds wherein each seed has a pair of opposed major faces and a peripheral edge, said method comprising the steps of:

(a) forming a groove in the ground having a width substantially equal to the distance between said faces;

(b) widening the groove adjacent its top to firm the sides thereof and thereby facilitate the placement of said seeds within the groove;

(c) depositing the seeds on said edges thereof into the groove whereby said faces engage said sides adjacent the bottom of the groove; and (d) filling said groove with soil while forcing the latter against the seeds to hold the seeds in firm engagement with said sides.

4. The method of claim 3 wherein is included the additional step of depositing the seeds in a plurality of generally parallel extending rows with the seeds of each row being in off-set disposition longitudinally of the rows from the corresponding seeds of the adjacent rows.

5. A method of planting seeds, each having a pair of opposed major faces circumscribed by a peripheral edge, said method comprising the steps of:

(a) forming a groove in the ground having a transverse dimension substantially equal to the distance between the major faces of said seeds;

(b) widening the sides of said groove adjacent the uppermost portion thereof to facilitate the placement of said seeds within the groove;

(c) depositing said seeds on edge within the groove whereby said faces of the seeds are in relatively close proximity to the ground defining said groove; and (d) covering said groove with soil after said seeds have been placed therewithin while forcing the seeds into firm engagement with the sides of the groove.

6. A method of planting seeds, each having a pair of opposed, major faces circumscribed by a peripheral edge, said method comprising the steps of:

(a) forming a groove in the ground having a transverse dimension substantially equal to the distance between the major faces of said seeds;

(b) firming the sides of said groove adjacent the uppermost portion thereof to facilitate the placement of said seeds within the groove;

(c) widening the sides of said groove adjacent the uppermost portion thereof to facilitate the placement of said seeds within the groove;

(d) depositing said seeds on edge within the groove whereby said faces of the seeds are in relatively close proximity to the ground defining said groove; and (e) covering said groove with soil after said seeds have been placed therewithin while forcing the seeds into firm engagement with the sides of the groove.

7. A method of planting seeds, each having a pair of opposed major faces circumscribed by a peripheral edge, said method comprising the steps of:

(a) forming a groove in the ground having a transverse dimension substantially equal to the distance between the major faces of said seeds;

(b) firming the sides of said groove adjacent the uppermost portion thereof to facilitate the placement of said seeds within the groove;

(c) widening said groove adjacent the uppermost portion thereof to facilitate the placing of said seeds within the groove;

(d) maintaining the groove free of clods and loose soil at least until said seeds have been deposited in said groove;

(e) depositing said seeds within the groove, whereby the seeds are disposed on edge and said faces thereof are in relatively close proximity to the ground defining said groove; and (f) covering the seeds with soil.

8. A method of planting seeds, each having a pair of opposed major faces circumscribed by a peripheral edge, said method comprising the steps of:

(a) forming a groove in the ground having a transverse dimension substantially equal to the distance between the major faces of said seeds;

(b) widening said groove adjacent the uppermost portion thereof to facilitate the placing of said seeds within the groove;

(c) maintaining the groove free of clods and loose soil at least until said seeds have been deposited in said groove;

(d) depositing said seeds within the groove with the seeds disposed on edge and said faces thereof in relatively close proximity to the ground defining said groove; and (e) covering said groove with soil after said seeds have been placed therewithin while forcing the seeds into firm engagement with the sides of the groove.

9. A method of planting seeds, each having a pair of opposed, major faces circumscribed by a peripheral edge, said method comprising the steps of:

(a) forming a groove in the ground having a transverse dimension substantially equal to the distance between the major faces of said seeds;

(b) firming the sides of said groove adjacent the uppermost portion thereof to facilitate the placement of said seeds within the groove;

(c) widening the sides of said groove adjacent the uppermost portion thereof to facilitate the placement of said seeds within the groove;

(d) maintaining the groove free of clods and loose soil at least until said seeds have been deposited in said groove;

(e) depositing said seeds on edge within the groove with said faces thereof in relatively close proximity to the ground defining said groove; and (f) covering said groove with soil after said seeds have been placed therewithin while forcing the seeds into firm engagement with the sides of the groove.

References Cited by the Examiner

UNITED STATES PATENTS

| | | | |
|---|---|---|---|
| 335,954 | 2/86 | Pedrick | 111–85 X |
| 340,103 | 4/86 | Courson | 111–87 |
| 433,036 | 7/90 | Rhodes | 111–86 X |
| 740,091 | 9/03 | Cole | 111–86 |
| 1,074,749 | 10/13 | Schoening | 111–86 X |
| 2,357,760 | 9/44 | Peacock | 111–85 |
| 2,514,890 | 7/50 | McLemore | 47–58 |
| 2,571,491 | 10/51 | Schindler | 47–56 |
| 2,577,775 | 12/51 | Lemmon | 111–85 |
| 2,842,899 | 7/58 | Padrick | 47–58 |
| 2,961,981 | 11/60 | Sooter | 111–85 |
| 2,980,041 | 4/61 | Nielsen | 111–3 |
| 3,023,718 | 3/62 | Sorensen | 111–85 |

OTHER REFERENCES

The Structure of Economic Plants, by Herman E. Hayward, published in 1938. (Pages 118 and 119 relied on.)

Agricultural Research, vol. 7, No. 9, March 1959 (pages 6 and 7 relied on).

ABRAHAM G. STONE, Primary Examiner.

A. JOSEPH GOLDBERG, Examiner.